(12) United States Patent
Goto

(10) Patent No.: US 6,553,173 B1
(45) Date of Patent: *Apr. 22, 2003

(54) INSTALLATION STRUCTURE FOR OPTICAL FIBER

(75) Inventor: Akio Goto, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,331

(22) Filed: May 14, 1999

(30) Foreign Application Priority Data

May 15, 1998 (JP) .......................... 10-133849

(51) Int. Cl.[7] ................................ G02B 6/00
(52) U.S. Cl. .................... 385/137; 385/65; 385/99
(58) Field of Search .................. 385/137, 65, 83, 385/76, 98, 88, 92, 49

(56) References Cited

U.S. PATENT DOCUMENTS

| | | | | |
|---|---|---|---|---|
| 5,671,315 A | * | 9/1997 | Tabuchi et al. | 385/237 |
| 5,689,599 A | * | 11/1997 | Shahid | 385/83 |
| 5,692,089 A | * | 11/1997 | Sellers | 385/137 |
| 5,961,849 A | * | 10/1999 | Bostock et al. | 385/83 |
| 6,012,856 A | * | 1/2000 | Kim et al. | 385/99 |

FOREIGN PATENT DOCUMENTS

| | | |
|---|---|---|
| JP | 61105517 | 5/1986 |
| JP | 63-21611 | 1/1988 |
| JP | 63-21613 | 1/1988 |
| JP | 8-194135 | 7/1996 |
| JP | 8-201662 | 8/1996 |
| JP | 9-127375 | 5/1997 |
| JP | 9-145962 | 6/1997 |
| JP | 9-283774 | 10/1997 |

* cited by examiner

Primary Examiner—Cassandra Spyrou
Assistant Examiner—Euncha Cherry
(74) Attorney, Agent, or Firm—Dickstein, Shapiro, Morin & Oshinsky, L.L.P.

(57) ABSTRACT

An installation structure for positioning and holding an optical fiber by means of a V-shaped groove formed on a substrate is disclosed. The V-shaped groove is divided into a positioning section and an alignment fixing section. The positioning section has groove width and depth for allowing the optical fiber to have a contact therewith. The alignment fixing section has groove width and depth larger than those of the positioning section to an extent for not allowing the optical fiber to have a contact therewith, when the optical fiber is disposed on the V-shaped groove.

17 Claims, 5 Drawing Sheets

INSTALLATION STRUCTURE FOR OPTICAL FIBER

BACKGROUND OF THE INVENTION

1. Field of the Invention

The present invention relates to installation technique for optical fibers, and in particular to an installation structure having a V-shaped groove for placing an optical fiber.

2. Description of the Related Art

There has been known an installation structure having a V-shaped groove for placing an optical fiber at a predetermined position and a pressing plate covered on the optical fiber to fix it in the V-shaped groove, thereby to position and hold the optical fiber with no adjustment. Accordingly, such an installation structure has been widely employed in the field of a device requiring the installation of an optical fiber with no adjustment, for example, in an optical communication module for optically coupling an optical fiber with a light-emitting device used as a light source, or in an optical connector for optically connecting optical fibers with each other, or the like. As a structure for connecting optical fibers with each other, there has been known a ferrule type connector for connecting the optical fibers through a ferrule mounted on an end outer periphery of both optical fibers.

As techniques relating to an installation structure having a V-shaped groove for placing an optical fiber, there have so far been proposed various types. See "A method of manufacturing a photoelectric conversion module having an optical fiber" as described in Japanese Patent Application Laid-open Publication No. 61-105517, "A method of manufacturing an optically coupled device and an edge-emitting type semiconductor" as described in Japanese Patent Application Laid-open Publication No. 8-201662, "An optically coupled module and a method of manufacturing the same" as described in Japanese Patent Application Laid-open Publication No. 9-127375, etc.

According to a conventional installation structure having the V-shaped groove, positioning, alignment and fixing of an optical fiber are carried out together in one whole V-shaped groove. Therefore, too much large area is required for contacting the groove surface of the V-shaped groove with the optical fiber, and there has been a risk of an occurrence of a floating or a bending of the optical fiber due to the elasticity of the optical fiber depending on an installation angle, a pressing force and a pressing method at the time of installing the optical fiber.

Because of the above reason, according to the conventional installation structure for an optical fiber, it has been difficult to install a plurality of optical fibers in the same precision on a plurality of V-shaped grooves. In other words, it has been difficult to position optical fibers in alignment in high precision with satisfactory reproducibility.

Particularly, in recent years, there has been an increasing trend of applications requiring an installation of an optical fiber having a lens at the end thereof or a multi-core array optical fiber. There has also been an increasing requirement for installing the optical fiber in much higher precision on the V-shaped groove substrate. However, the prior-art installation structure has not been able to meet sufficiently such requirement for high-precision installation.

In the mean time, for preventing the floating and bending of an optical fiber, it is necessary to fix the whole periphery of the optical fiber. However, according to the prior-art installation structure for an optical fiber, the optical fiber is fixed by being pressed with a pressing plate, that is, the optical fiber is mechanically sandwiched between the pressing plate and the V-shaped groove. Therefore, it is structurally impossible to fix the whole periphery of an optical fiber based on the prior-art installation structure. As a result, according to the prior-art installation structure for an optical fiber, the fixing strength of an optical fiber is not sufficient and there has been a possibility of a deviation or dropping of the optical fiber.

Further, according to the prior-art installation structure for an optical fiber based on a fixing system using a pressing plate, at the time of fixing the pressing plate to the V-shaped groove substrate with a fixing agent such as a resin, a solder or the like, it is not possible to prevent this fixing agent from flowing into the V-shaped groove where the optical fiber is going to be positioned. The flow of the fixing agent into the V-shaped groove possibly causes a floating and a positions deviation of the optical fiber. Therefore, it can be said that the prior-art installation structure for an optical fiber involves factors for further interrupting a high precision installation of the optical fiber.

In Japanese Patent Application Laid-open Publication No. 8-194135, a substrate for fixing an optical fiber has been disclosed with has a V-shaped groove with varying in width along the optical fiber. Such a V-shaped groove allows the optical fiber to be arbitrarily angled to adjust the optical axis or the optical fiber just right. In other words, this fiber fixing substrate needs to adjust the optical axis of the optical fiber. Therefore, this prior art is not related to an installation structure for positioning and holding the optical fiber with no adjustment.

SUMMARY OF THE INVENTION

It is an object of the present invention to provide an installation structure for an optical fiber, which enables an optical fiber to be placed on a V-shaped groove with reliability and precision.

It is another object of the present invention to provide an installation structure which can suppress a floating or a bending of the optical fiber due to its elasticity and which enables the whole periphery of the optical fiber to be fixed, for achieving the installation of the optical fiber in high precision, with high strength and with high reliability.

According to the present invention, in an installation structure for positioning and holding an optical fiber by means of a V-shaped groove formed on a substrate, the V-shaped groove comprises a positioning section and an alignment fixing section. The positioning section has a groove width and a groove depth for allowing an outer periphery of the optical fiber to have a contact therewith. The alignment fixing section has a groove width and a groove depth larger than those of the positioning section to an extent for not allowing the outer periphery of the optical fiber to have a contact therewith, when the optical fiber is disposed on the V-shaped groove.

Since the V=shaped groove is divided into the positioning section and the alignment fixing section, the outer peripheral of the optical fiber comes into contact with only the positioning section to place it at a predetermined position and is not in contact with the alignment fixing section. Therefore, it is possible to fix the optical fiber with a fixing agent in the alignment fixing section and to minimize the length of the positioning section.

DESCRIPTION OF THE PREFERRED EMBODIMENTS

FIRST EMBODIMENT

A first embodiment of the present invention will be described in detail with reference to FIGS. 1 to 3, taking as an example an application to an optical coupler for coupling a light-emitting source and an optical fiber.

Figure 1:
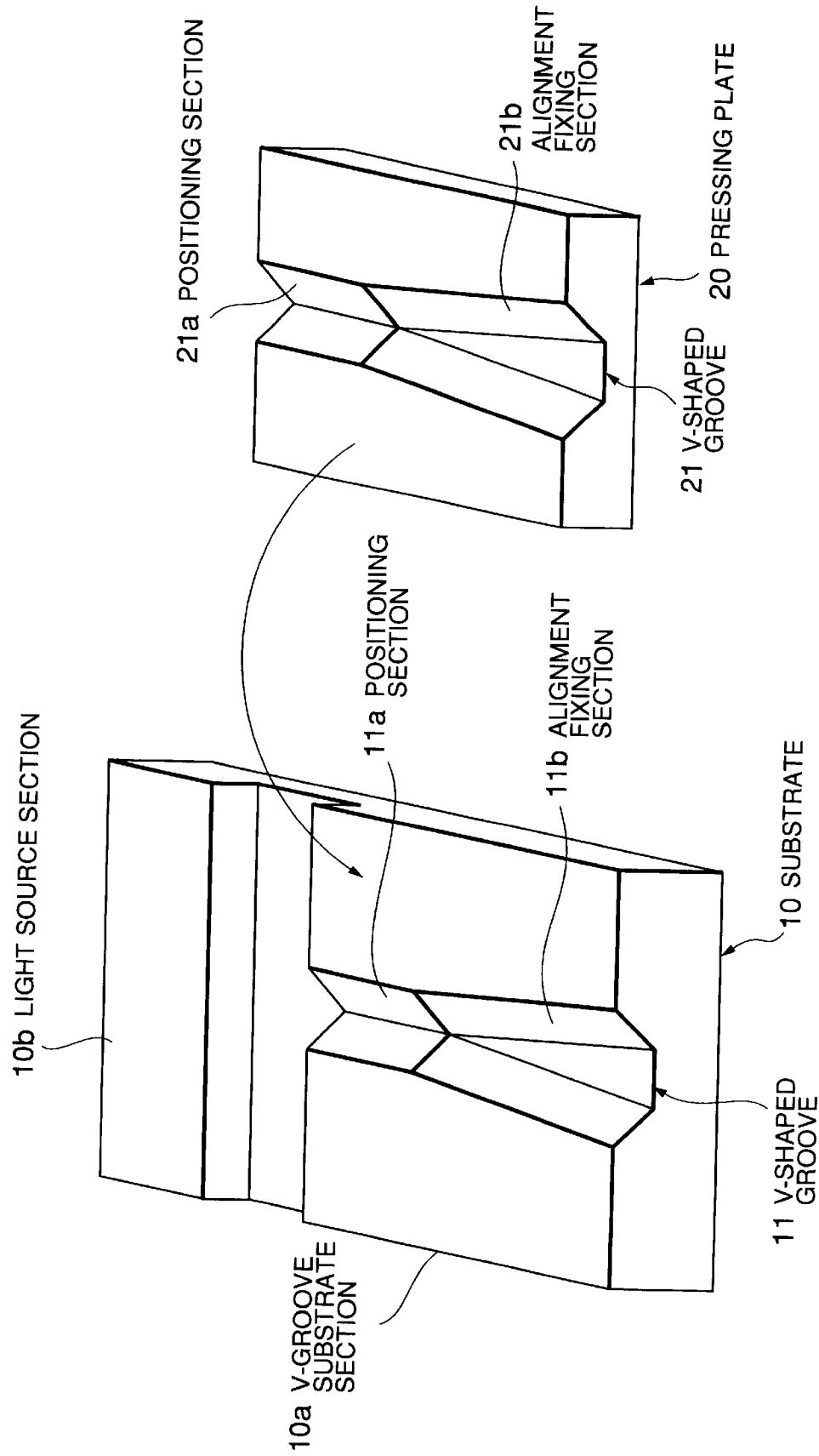
FIG. 1 is a perspective view illustrating a substrate and a pressing plate to be used in an installation structure for an optical fiber according to a first embodiment of the present invention.

Referring to FIG. 1, a substrate 10 is made of silicon, for example. On one surface (an upper surface in the example shown) of the substrate 10, a v-groove substrate section 10a and a light source section 10b are formed integrally with a groove provided therebetween.

On the upper surface of the V-groove substrate section 10a, there is formed a v-shaped groove 11 having approximately a v-shaped cross-section traversing in a longitudinal direction, with the v-shaped groove 11 opening on both end surfaces of the v-groove substrate section 10a. In the illustrated example, the v-shaped groove 11 is formed toward a light emitting element provided in the light source section 10b, and this direction is almost parallel with an optical axis of the light emitting element. In the illustrated example, the v-shaped groove 11 is composed of a positioning section 11a formed at one end side of the v-groove substrate section 10a (the light source section side) and an alignment fixing section 11b formed at the other end side of the v-groove substrate section 11a. The light emitting element provided in the light source section 10b is a laser light source such as a laser diode.

When an optical fiber is disposed on the v-shaped groove 11, the positioning section 11a positions and supports an end portion of the optical fiber in such a state that the end of the optical fiber faces the light omitting element provided in the light source section 10b. In the present embodiment, the positioning section 11a has a groove width and a groove depth large enough for allowing the v-shaped groove 11 to support the optical fiber by keeping contact with an outer periphery of the optical fiber in a state that a part of the outer periphery protrudes from the upper surface of the v-groove substrate section 10a.

More specifically, the groove width and the groove depth of the positioning section 11a are determined based on an outer peripheral distance of the optical fiber and a height position of the optical axis of the light emitting element so that the optical axis of a core section exposed to an end surface of the optical fiber coincides with the optical axis of the light emitting element provided in the light source 10b when the optical fiber is disposed on the positioning section 11a. The valley of the v-shaped groove 11 in the positioning section 11a is almost parallel with the upper surface of the v groove substrate section 10a.

On the other hand, the alignment fixing section 11b has a groove width and a groove depth larger than those of the positioning section 11a to an extent for not allowing the outer periphery of the optical fiber to have a contact with the v-shaped groove 11 when the optical fiber is disposed on the v-shaped groove 11. The v-shaped groove 11 in the alignment fixing section 11b is formed to gradually expand toward one end of the v-groove substrate section 10a from a joint section with the positioning section 11a. The length of the positioning section 11a is formed smaller than the length of the alignment fixing section 11b.

In the first embodiment, there is provided a pressing plate 20 for covering the v-shaped groove 11 open on the upper surface of the v-groove substrate section 10a. This pressing plate 20 has a v-shaped groove 21 corresponding to the v-shaped groove 11 of the v-groove substrate section 10a. In other words, the v-shaped groove 21 has a positioning section 21a having a groove width and a groove depth for allowing a part of the outer periphery of the optical fiber to have a contact therewith and an alignment of fixing section 21b having a groove width and a groove depth larger than those of the positioning section 21a to an extent for not allowing the outer periphery of the optical fiber to have a contact therewith, when the optical fiber is disposed on the V-shaped groove 11 of the V-groove substrate section 10a.

The V-shaped groove 11 of the V-groove substrate section 10a and the V-shaped groove 21 of the pressing plate 20 can be formed at predetermined positions to have a predetermined width and a predetermined depth, respectively, by an isotropic etching of the silicon substrate 10 using potassium hydroxide (KOH) or the like or by machining the silicon substrate 10.

In this case, if the V-shaped grooves 11 and 21 are formed by etching using potassium hydroxide (KOH) or the like, it is possible to form both positioning sections 11a and 21a and both alignment fixing sections 11b and 21b together by making a mask width of the positioning sections larger than that of the alignment fixing sections. Therefore, desired V-shaped grooves are easily formed with precision.

On the other hand, if the V-shaped grooves 11 and 21 are formed by mechanical processing using a router or the like, V-shaped grooves can be formed as desired in a similar manner by cutting the alignment fixing sections 11b and 21b to have a large width and a larger depth than those of the positioning sections 11a and 21a.

A method of installing an optical fiber having an optical fiber installation structure according to the first embodiment of the above-described structure will be explained below with reference to FIGS. 2 and 3.

Figure 2:
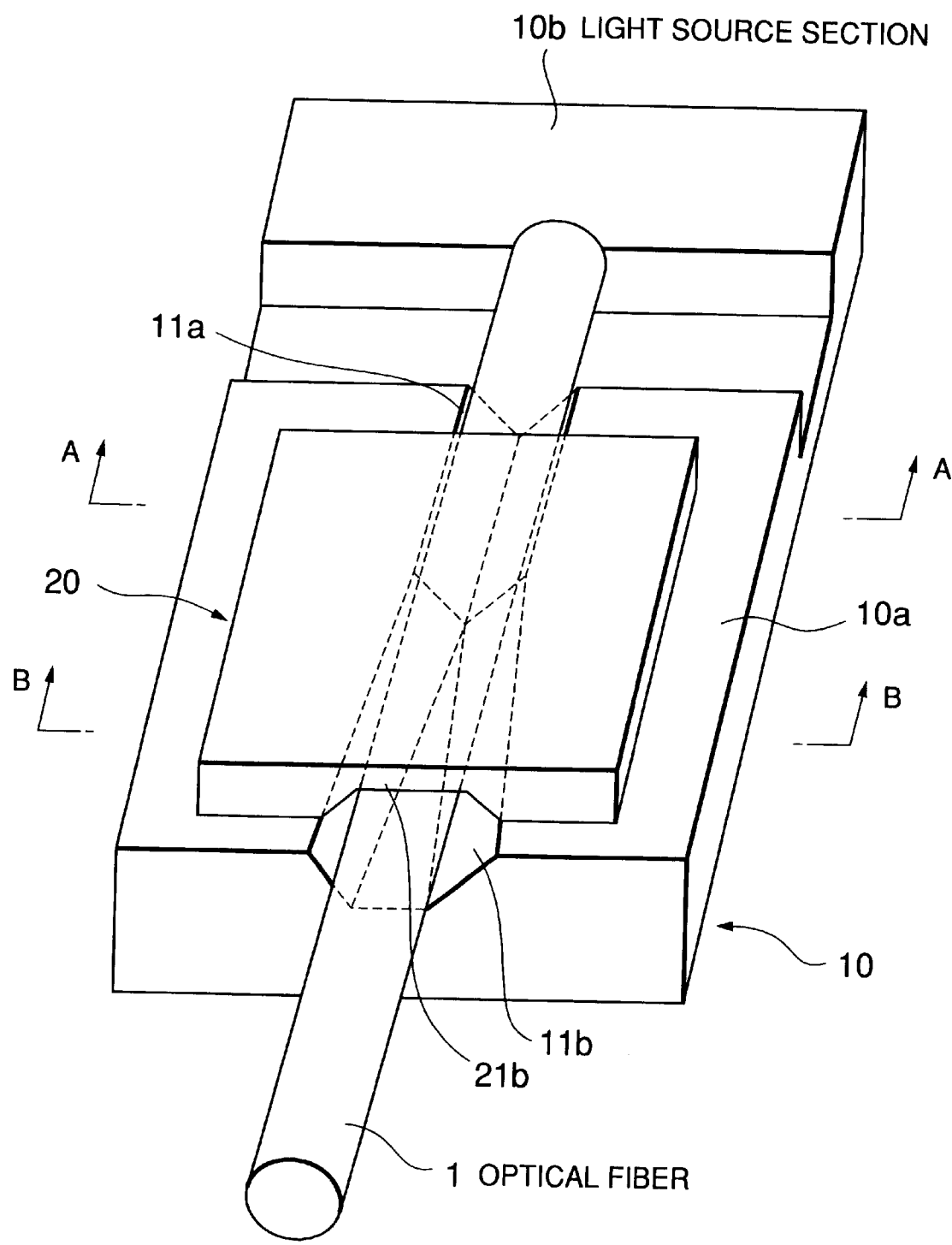
FIG. 2 is a perspective view of a completion status having an optical fiber installed on the substrate using the pressing plate as shown in FIG. 1.

As shown in FIG. 2, an optical fiber 1 is disposed within the V-shaped groove 11 of the V-groove substrate section 10a, and the end portion of the optical fiber 1 is adjusted at the position of the light source section 10b. The optical fiber 1 is supported within the positioning section 11a in a state that the end portion protrudes from the other end of the positioning section 11a and a part of the periphery extends above the upper surface of the V-groove substrate section 10a.

In this state, the pressing plate 20 is mounted on the upper surface of the V-groove substrate section 10a by matching the position of the V-shaped groove 21 with the position of the V-shaped groove 11 at the V-groove substrate section 10a side, while holding the optical fiber 1.

Figure 3A:
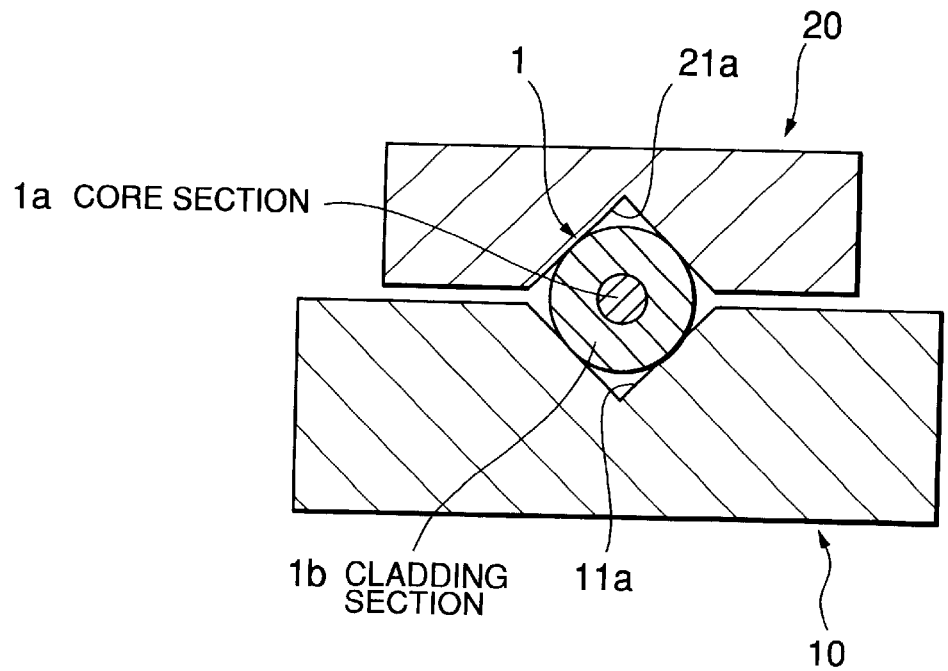
FIG. 3A is a cross-sectional view of the installation structure cut along A—A line of FIG. 2.
Figure 3B:
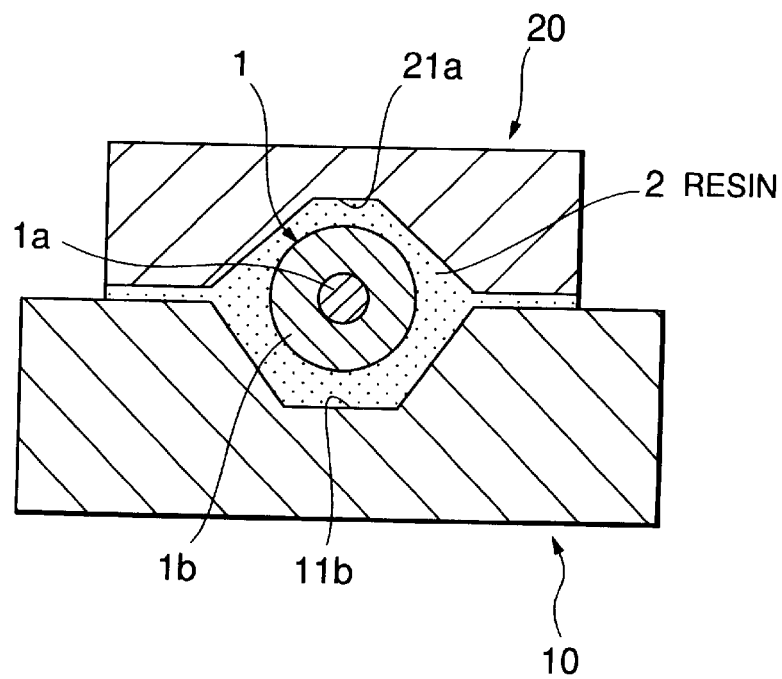
FIG. 3B is a cross-sectional view of the installation structure cut along B—B line of FIG. 2.

With the above operation, the optical fiber 1 is positioned by keeping its outer periphery of the end portion in contact with the positioning sections 11a and 21a of the tow V-shaped grooves 11 and 21 (see FIG. 3A). In other words, the core section 1a exposed to the end portion of the optical fiber 1 is set at a position coinciding with the optical axis of the light-emitting element of the light source section 10b by facing the light-emitting element.

In this case, at the alignment fixing sections 11b and 21b of the V-shaped grooves 11 and 21, the outer periphery of the optical fiber 1 is not in contact with the groove surface, and there exists a space around the whole periphery of the optical fiber 1. The resin 2 is filled in this space (see FIG. 3B). The resin 2 not only fills the alignment fixing sections 11b and 21b but also enters into a space between the V-groove substrate section 10a and the pressing plate 20. As a result, the optical fiber 1 is fixed in the V-shaped grooves 11 and 21 of the alignment fixing sections 11b and 21b with the resin 2, and the pressing plate 20 is also firmly fixed to the upper surface of the V-groove substrate section 10a. Thus, the installation of the optical fiber 1 has been completed.

The outer periphery of the end portion of the optical fiber 1 is brought into contact with the groove surfaces of the positioning sections 11a and 21a of the V-shaped grooves 11 and 21 formed on the substrate 10 and the pressing plate 20, respectively, with all parts of the optical fiber being constrained, so that the optical fiber 1 is positioned in a state that the optical axis of the core section 1a exposed to the end portion coincides with the optical axis of the light-emitting element of the light source section 10b.

As a result, an efficient optical coupling between the core section 1a of the optical fiber 1 and the light-emitting element of the light source section 10b is achieved with no adjustment, and an optical communication module can be provided.

According to the first embodiment, the V-shaped grooves 11 and 21 are divided into the positioning sections 11a and 21a for positioning the optical fiber 1 respectively and the alignment fixing sections 11b and 21b for fixing the optical fiber 1 respectively, and the side surfaces of the V-shaped grooves 11 and 21 are brought into the outer periphery of the optical fiber 1 at only the positioning sections 11a and 21a. Therefore, the positioning sections 11a and 21a may be short enough to achieve the required function, so that these sections can have a minimum required length.

As the positioning sections 11a and 21a can have a relatively small length, the floating or bending of the optical fiber as generated in the prior-art uniform V-shaped groove can be suppressed, and the optical fiber 1 can be alighted and fixed easily onto the V-groove substrate sections 10a in high precision regardless of an installation method or the like.

Further, by dividing the V-shaped grooves 11 and 21 into the positioning sections 11a and 21a and the alignment fixing sections 11b and 21b, respectively, the area of the contact between the groove surfaces of the V-shaped grooves 11 and 21 and the optical fiber 1 can be minimized. Therefore, it is possible to reduce stress or the like generated by the pressure applied to the optical fiber 1, and thus it becomes possible to reduce excess loss due to the pressure at the time of fixing the optical fiber 1 in the installation.

On the other hand, since the optical fiber 1 is in a floating state at the alignment fixing sections 11b and 21b of the V-shaped grooves 11 and 21, there exists a space around the whole outer periphery of the optical fiber 1 within the alignment fixing sections 11b and 21b, This makes it possible to fill the fixing agent such as the resin 2 or the like around the whole periphery of the optical fiber 1 for fixing the optical fiber 1. Therefore, it is made possible to fix the optical fiber 1 with the fixing agent by securing a wide fixing area unlike the conventional fixing based on only the pressing force of a pressing plate. Thus, the fixing strength of the optical fiber 1 can be improved. The pressing plate 20 has only the function of pressing the optical fiber to avoid its move until the completion of the filling.

Further, as the fixing agent of the resin 2 or the like for fixing the optical fiber 1 is filled in the space formed by the alignment fixing sections 11b and 21b, the resin 2 does not flow into the positioning sections 11a and 21a for positioning the optical fiber 1. Also, there does not arise a floating of the optical fiber 1 due to the flow-in of a fixing agent unlike the conventional practice. This makes it possible to achieve a higher-precision positioning of the optical fiber.

In the first embodiment, a serial-type installation structure is employed for forming only one V-shaped groove 11 on the upper surface of the V-groove substrate section 10a. However, it is also possible to employ a parallel-type installation structure for forming a plurality of V-shaped grooves in parallel on the substrate, or to employ a hierarchical structure. In other words, it is possible to achieve an installation structure for an optical fiber based on a status of disposition of the light-emitting element provided on the light source section 10b.

Further, as is clear from the above explanation, the fixing can be done sufficiently by the alignment fixing section 11b. Therefore, the pressing plate 20 can have only the positioning section 21a, and is not fixed but can be taken out after the filling of the fixing agent. The optical fiber 1 can also be structured such that the whole outer periphery is accommodated within the V-shaped groove 11.

Furthermore, although the V-groove substrate section formed with the V-shaped groove and the light source section are formed together on the same substrate according to the first embodiment, these sections may be formed in separate structures. The light source section may be a light receiving section disposed with a light-receiving element (PD). In this case, the optical fiber may be wound with a ferrule at its end portion. The "outer periphery of the optical fiber" in this case becomes the "outer periphery of the ferrule". If the ferrule is metalized, a solder can also be used as the fixing agent.

SECOND EMBODIMENT

Figure 4:
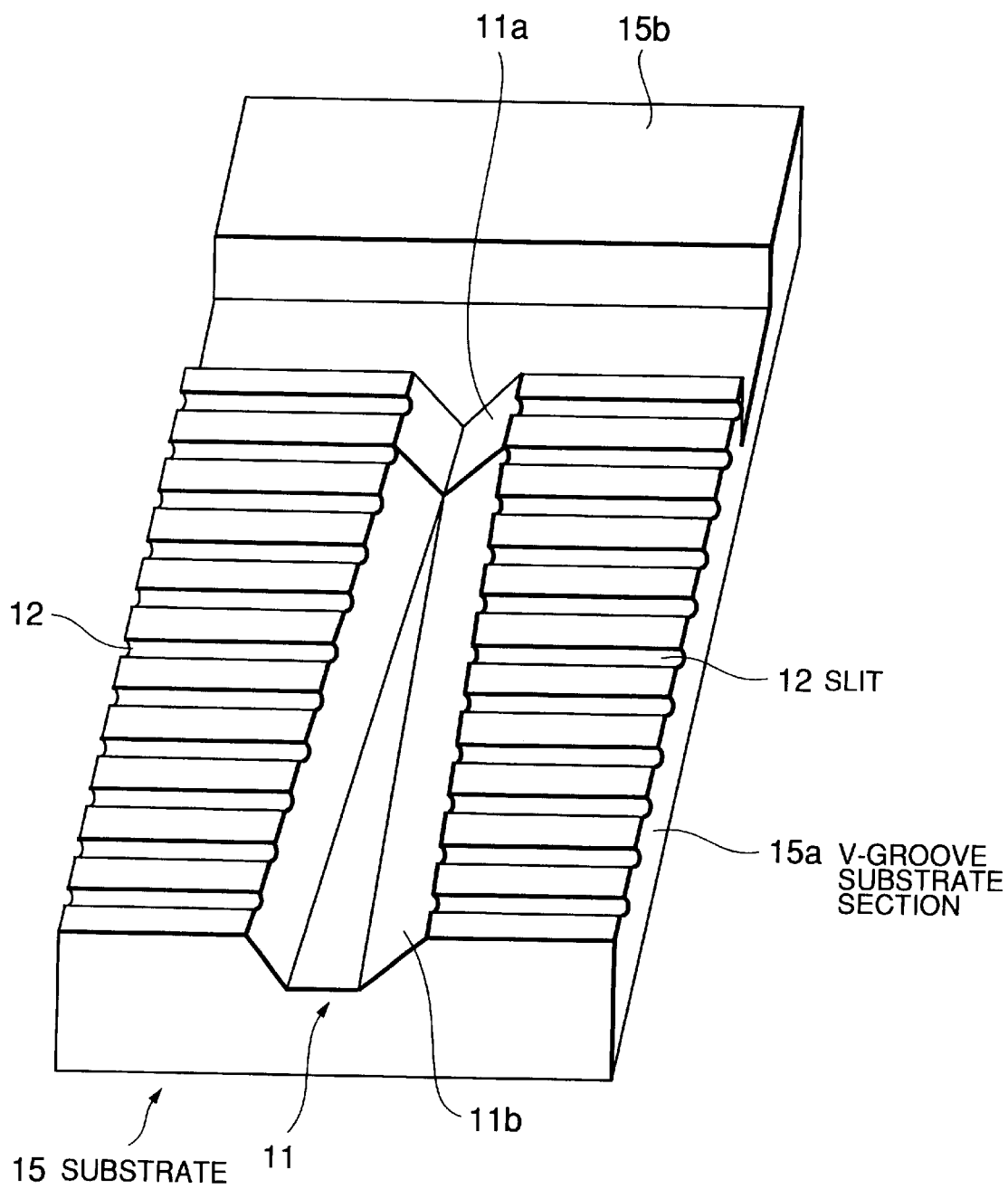
FIG. 4 is a perspective view for showing a substrate to be used in an installation structure according to a second embodiment of the present invention.

In FIG. 4, an application to an optical communication module similar to the above-described first embodiment is shown. In other words, a V groove substrate section 15a and a light source section 15b are formed together on a substrate 15, in a manner similar to the first embodiment. The second embodiment is different from the first embodiment in that a plurality of slits 12 extending to a V-shaped groove 11 are formed on the upper surface of the V-groove substrate section 15a. Other constituent parts are identical with those of the first embodiment, which are denoted by the same reference numbers and their detailed explanation are omitted.

Referring to FIG. 4, the slits 12 are formed in a comb shape on both sides sandwiching the V-shaped groove 11,, each of the slits 12 extending to the V-shaped groove 11. These slits 12 can be formed by etching or by mechanical processing in a manner similar to the forming method of the V-shaped groove 11 explained in the first embodiment.

According to the second embodiment of the above-described configuration, a fixing agent such as a resin or the like for fixing the optical fiber 1 can flow through the slits 12 from an alignment fixing section 11b, so that the fixing agent is filled into the space between a V-groove substrate section 15a and a pressing plate 20. This makes it possible to fix the pressing plate 20 more firmly to the V shape groove substrate 15a, ensuring a further improved fixing strength of the optical fiber 1.

The provision of the slits 12 enables the fixing agent to be filled into the slits 12 as well, and this can securely prevent the flow of surplus fixing agent into the positioning section 11a, ensuring a higher-precision positioning without an occurrence of a floating or a positions deviation of the optical fiber 1.

Since the slits 12 are formed for providing an escape route for the resin 2, there may be formed at least one slit 12 extending to the V-shaped groove 11. The slit 12 may be formed to at least extend to the alignment fixing section 11b to be filled with the resin 2.

Further, although not shown in the second embodiment, it is needless to mention that there may also be provided slits similar to the slits 12 on the pressing plate 20 facing the substrate in the above-described first embodiment.

THIRD EMBODIMENT

Figure 5:
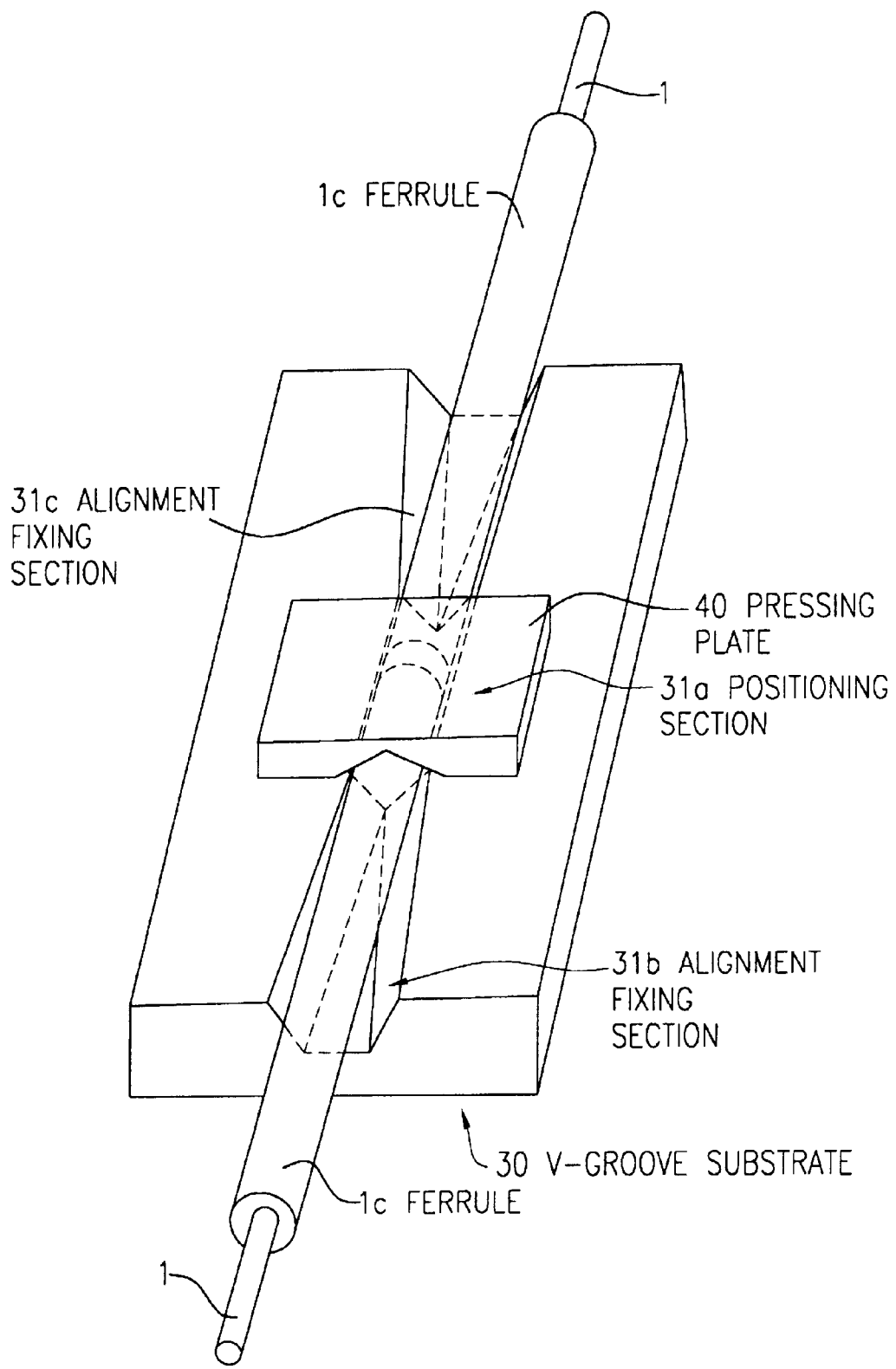
FIG. 5 is a perspective view for showing a status that two optical fibers are connected in an installation structure according to a third embodiment of the invention.

In FIG. 5, an application to a ferrule type connector is shown as a third embodiment of the present invention.

A V-groove substrate 30 is a silicon substrate. On this V-groove substrate 30, there is formed a V-shaped groove 31 composed of a positioning section 31a and alignment fixing sections 31a and 31c, wherein the positioning section 31a is disposed between the two alignment fixing sections 31b and 31c, these positioning section 31a and alignment fixing sections 31b and 31c are formed on the substrate 30 by etching or by mechanical processing in a similar manner to the above-described two embodiments.

Each of two optical fibers 1 disposed on the V-shaped groove 31 is wound with a ferrule 1c on the outer periphery of an end portion. When the two optical fiber 1 are disposed on the V-shaped groove 31, the positioning section 31a becomes in contact with a part of the outer periphery of the ferrule 1c wound around the end portion of each optical fiber 1 and positions these optical fibers by supporting the ends portions of these fibers in a state that their optical axes coincide with each other. The respective alignment fixing sections 31b and 31c not in contact with the outer peripheries of the ferrules wound around the end portions of the optical fibers.

On the upper surface of the positioning section 31a of the V-shaped groove 31, there may be mounted a pressing plate 40 for pressing the end portions of the ferrules of the positioned optical fibers not to allow the move thereof. This pressing plate 40 has a V-shaped groove having a shape corresponding to the positioning section 31a of the V-shaped groove 31.

In the above structure, the two optical fibers are disposed on the positioning section 31a in a state that their end surfaces face with each other. Then, the pressing plate 40 is mounted on these optical fibers to avoid a move thereof. The two optical fibers are positioned and supported with a part of the outer periphery of the ferrules kept in contact with the groove surface of the positioning section 31a.

On the other hand, at the alignment fixing sections 31b and 31c sides, the ferrule outer peripheries of the two optical fibers are not brought into contact with the groove surfaces of the alignment fixing sections 31b and 31c, so that there is a space formed between the groove surface and the ferrule outer periphery. In this state, a fixing agent is filled in the alignment fixing sections 31b and 31c. When the ferrules are metalized, solder can also be used in stead of a resin as the fixing agent. With this arrangement, the ferrule outer peripheries of the two optical fibers are fixed to the alignment fixing sections 31b and 31c.

Thus, a ferrule type connector can be achieved for optically connecting the two optical fibers, with their optical axes coincided with each other with no adjustment.

The pressing plate 40 may be fixed, or may not be fixed and removed after completing the filling of the fixing agent as the pressing plates are just for keeping pressing the optical fibers until they are fixed, as described above. The pressing plate 40 may be for covering the alignment fixing section as well as the positioning section like the first embodiment. In this case, the pressing plate 40 is fixed with the fixing agent.

Although the third embodiment shows the case of optically connecting a set of optical fibers, it is also possible to structure easily a ferrule type connector for optically connecting a plurality of sets of optical fibers by forming a plurality of V-shaped grooves in parallel on the V-shaped groove substrate 30.

As explained above, according to the present invention, the V-shaped groove for installing an optical fiber is divided into the positioning section for positioning an end portion of the optical fiber at a predetermined position and the alignment fixing section having no contact with the outer periphery of the optical fiber. Therefore, the positioning section of the V-shaped groove can have a minimum necessary length, and it is possible to suppress a floating or a bending of the optical fiber due to the elasticity thereof.

Further, since the whole periphery of the optical fiber is fixed with the fixing agent at the alignment fixing section, excess stress and the like to the optical fiber can be reduced at the time of installing the optical fiber in the V-shaped groove. As a result, the present invention can achieve a highly reliable installation of an optical fiber in high precision and the high strength.

What is claimed is:

1. An installation structure for positioning and holding an optical fiber on a substrate having opposed ends, comprising:

a positioning section on the substrate including a first groove having a V-shaped cross-section, the first groove having a width and a depth for allowing an outer periphery of the optical fiber to have contact therewith;

an alignment fixing section on the substrate including a second groove having:

a V-shaped cross-section at a first end thereof in communication with and having substantially the same groove width and groove depth of the first groove;

a U-shaped cross-section at a second end opposed to the first end, the second groove having a substantially flat floor extending from the first end to the second end;

walls tapering from the second groove at the second opposed end to the first groove;

the second groove at the second opposed end having a greater width and depth than the first groove;

the second groove designed such that the optical fiber does not contact the walls and the floor of the second groove;

wherein the installation structure mates with a pressing plate to press the optical fiber in the positioning section, the pressing plate including a pressing plate groove, the pressing plate groove being shaped substantially the same as the first groove, and walls defining the pressing plate groove being effective to press the optical fiber in the positioning section; and wherein the alignment fixing section is enabled to received a material when said installation structure and the pressing plate press the optical fiber.

2. The installation structure according to claim 1, wherein at least one slit extending in a direction substantially perpendicular to a longitudinal direction of one of the first and second grooves is formed on one surface of the substrate in which the one of the first and second grooves is formed, the slit extending to the one of the first and second grooves.

3. The installation structure according to claim 1, wherein the optical fiber is fixed in the alignment fixing section with the material.

4. The installation structure according to claim 1, further comprising the pressing plate to be fixedly mounted on one surface of the substrate so as to cover an opening of the first groove of the substrate to press the optical fiber in the positioning section.

5. The installation structure according to claim 4, wherein the pressing plate comprises:
   a positioning section having a third groove having V-shaped cross-section and a groove width and a groove depth for allowing an outer periphery of the optical fiber to have a contact therewith; and
   an alignment fixing section including a fourth groove having:
      a V-shaped cross-section at a first end thereof in communication with and having the same groove width and groove depth of the third groove;
      a U-shaped cross-section at a second end opposed to the first end, the fourth groove having a substantially flat floor extending from the first end to the second end;
      walls tapering from the fourth groove at the second opposed end to the third groove;
      the fourth groove at the second opposed end having a greater width and depth than the third groove;
      such that the optical fiber does not contract the walls and the floor of the fourth groove.

6. The installation structure according to claim 4, wherein at least one slit extending in a direction substantially perpendicular to a longitudinal direction of one of the first and second grooves is formed on one surface of the substrate in which the one of the first and second grooves is formed, the slit extending to the one of the first and second grooves.

7. The installation structure according to claim 6, wherein a plurality of slits extending in a direction perpendicular to a longitudinal direction of the first groove are formed on the one surface of the substrate corresponding to the alignment fixing section, the slits extending to the first groove.

8. The installation structure according to claim 7, wherein the optical fiber is fixed in the alignment fixing section and the pressing plate is fixed to the one surface of the substrate with the material.

9. An optical coupler comprising:
   a light source section including at least one light source having a optical axis predetermined; and
   a substrate having opposed ends, and further having an installation structure for positioning and holding an optical fiber thereon,
   wherein the installation comprises:
      a positioning section on the substrate for positioning the optical fiber so as to coincide with the optical axis of the light source, the positioning section including a first groove having a V-shaped cross-section, the groove having a groove width and depth for allowing an outer periphery of the optical fiber to have contact therewith; and
      an alignment fixing section on the substrate including a second groove having:
         a V-shaped cross-section at a first end thereof in communication with and having substantially the same groove width and groove depth of the first groove;
         a U-shaped cross-section at a second end opposed to the first end, the second groove having a substantially flat floor extending from the first end to the second end;
         walls tapering from the second groove at the second opposed end to the first groove;
         the second groove at the second opposed end having a greater width and depth than the first groove;
         such that the optical fiber does not contact the walls and the floor of the second groove;
      wherein the installation structure mates with a pressing plate, the pressing plate including a pressing plate groove, the pressing plate groove being shaped substantially the same as the first groove, and walls defining the pressing plate groove being effective to press the optical fiber in the positioning section; and
      wherein the alignment fixing section is enabled to receive a material when the installation structure and the pressing plate press the optical fiber.

10. The optical coupler according to claim 9, wherein the optical fiber is fixed in the alignment fixing section with a fixing agent.

11. The optical coupler according to claim 9, wherein the pressing plate is fixedly mounted on one surface of the substrate so as to cover an opening of the first groove of the substrate to press the optical fiber in the positioning section.

12. The optical coupler according to claim 11, wherein at least one slit extending in a direction substantially perpendicular to a longitudinal direction of one of the first and second grooves is formed on one surface of the substrate in which the one of the first and second grooves is formed, the slit extending to the one of the first and second grooves.

13. A ferrule-type connection for optically connecting first and second optical fibers each having a ferrule provided thereon, comprising:
   a substrate having opposed ends and further having an installation structure for positioning and holding the first and second optical fibers by means of a V-shaped groove formed thereon,
   the installation structure comprising:
      a positioning section on the substrate for positioning the first and second optical fibers such that optical axes of the first and second optical fibers coincide with each other, the positioning section having a first V-shaped groove with a groove width and a groove depth for allowing an outer periphery of the ferrule of each of the first and second optical fibers to have contact therewith;
      first and second alignment fixing sections on the substrate for fixing the first and second, optical fibers, respectively, each of the first and second alignment fixing sections having:
         a V-shaped cross-section at a first end thereof in communication with and having substantially the same groove width and groove depth of the first groove;
         a U-shaped cross-section at a second end opposed to the first end, the second groove having a substantially flat floor extending from the first end to the second end;

walls tapering from the second groove at the second opposed end to the first groove;

the second groove at the second opposed end having a greater width and depth than the first groove;

such that the outer periphery of the ferrule of a corresponding optical fiber does not contact the walls and floor of the second groove;

wherein the installation structure mates with a pressing plate, the pressing plate including a pressing plate groove, the pressing plate being shaped substantially the same as the first groove, and walls defining the pressing plate groove being effective to press the optical fiber in the positioning section; and wherein the alignment fixing sections are enabled to receive a material when the installation structure and the pressing plate press the optical fibers.

14. The ferrule-type connector according to claim 13, wherein the first and second optical fibers are fixed in the first and second alignment fixing sections with the material, respectively.

15. The ferrule-type connector according to claim 13, wherein the pressing plate is fixedly mounted on one surface of the substrate so as to cover an opening of the first groove of the substrate to press the first and second optical fibers in the positioning section.

16. The ferrule-type connector according to claim 15, wherein at least one slit extending in a direction substantially perpendicular to a longitudinal direction of one of the first and second grooves is formed on one surface of the substrate in which the one of the first and second grooves is formed, the slit extending to the one of the first and second grooves.

17. A structure for positioning and holding an optical fiber on a substrate having opposed ends, comprising:

a positioning section on the substrate having a first groove with a V-shaped cross-section and a groove width and groove depth for allowing an outer periphery of the optical fiber to have contact therewith; and an alignment fixing section on the substrate having a second groove with a groove width and a grove depth larger than the groove width and the groove depth of the positioning section, for not allowing the outer periphery of the optical fiber to have contact therewith, when the optical fiber is disposed on the first groove, the second groove extending from one of the opposed ends of the substrate toward and into communication with the first groove, the second groove being tapered such that the second groove has a narrower width where the second groove communicates with the first groove than at the one opposed end, the second groove having a flat floor extending from the one opposed end of the substrate to where the second groove communicates with the first groove, and wherein the positioning and alignment fixing sections mate with a pressing plate to press the optical fiber in the positioning section, the pressing plate including a pressing plate groove, the pressing plate groove being shaped substantially the same as the first groove, and walls defining the pressing plate groove being effective to press the optical fiber in the positioning section; and wherein the alignment fixing section is enabled to receive a material when the installation structure and the pressing plate press the optical fiber.

\* \* \* \* \*